United States Patent
Liu et al.

(10) Patent No.: US 10,100,767 B2
(45) Date of Patent: Oct. 16, 2018

(54) METHOD AND SYSTEM FOR ENGINE COLD-START CONTROL

(71) Applicant: Ford Global Technologies, LLC, Dearborn, MI (US)

(72) Inventors: Chingpo Liu, Novi, MI (US); Aed M. Dudar, Canton, MI (US); Marcus William Fried, Farmington Hills, MI (US); Ron Reichenbach, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 14/733,196

(22) Filed: Jun. 8, 2015

(65) Prior Publication Data
US 2016/0356228 A1 Dec. 8, 2016

(51) Int. Cl.
*F02D 41/06* (2006.01)
*F02D 41/40* (2006.01)
*F02P 5/15* (2006.01)
*F02B 17/00* (2006.01)

(52) U.S. Cl.
CPC ......... *F02D 41/064* (2013.01); *F02D 41/402* (2013.01); *F02P 5/1506* (2013.01); *F02B 17/005* (2013.01); *F02D 2200/021* (2013.01); *Y02T 10/44* (2013.01); *Y02T 10/46* (2013.01)

(58) Field of Classification Search
CPC ....... Y02T 10/44; Y02T 10/123; Y02T 10/46; F02D 41/402; F02D 41/064; F02D 2041/389; F02D 41/3076; F02D 41/065; F02D 41/0255; F02D 19/061; F02D 41/062; F02D 37/02; F02D 41/403; F02D 41/024; F02D 19/0689; F02D 2200/021
USPC ......................................................... 123/300
See application file for complete search history.

(56) References Cited

U.S. PATENT DOCUMENTS

| | | | | |
|---|---|---|---|---|
| 5,797,367 A | * | 8/1998 | Iida ....................... | F02D 41/064 123/295 |
| 6,223,730 B1 | * | 5/2001 | Hasegawa ............. | F02D 41/047 123/491 |
| 6,647,948 B2 | * | 11/2003 | Kyuuma ............... | F02D 41/047 123/295 |
| 6,684,630 B2 | | 2/2004 | Uchida et al. | |
| 7,234,440 B2 | | 6/2007 | Hilditch | |
| 7,561,957 B1 | | 7/2009 | Santoso et al. | |
| 8,712,669 B2 | | 4/2014 | Krengel et al. | |
| 8,775,054 B2 | | 7/2014 | Vincenzi et al. | |
| 2001/0022168 A1 | * | 9/2001 | Teraji ....................... | F02B 1/12 123/295 |
| 2002/0046730 A1 | * | 4/2002 | Hosokawa ............. | F02D 37/02 123/295 |
| 2008/0035106 A1 | * | 2/2008 | Stein ....................... | F02B 47/04 123/304 |
| 2010/0108024 A1 | * | 5/2010 | Ogura ................... | F02D 41/126 123/299 |

(Continued)

*Primary Examiner* — Sizo Vilakazi
(74) *Attorney, Agent, or Firm* — Julia Voutyras; McCoy Russell LLP

(57) ABSTRACT

Methods and systems are provided for improving engine start roughness. In one example, a method for reducing engine start NVH includes operating the engine with a split fuel injection while advancing injection timing as engine coolant temperature increases. The method allows for a smoother engine start while also reducing false misfire incidences.

18 Claims, 5 Drawing Sheets

(56) References Cited

U.S. PATENT DOCUMENTS

| | | |
|---|---|---|
| 2012/0022771 A1* | 1/2012 | Kita ........................ F02D 41/32 |
| | | 701/104 |
| 2012/0143477 A1 | 6/2012 | Ruona et al. |
| 2012/0245827 A1* | 9/2012 | Glugla ................ F02D 41/3094 |
| | | 701/105 |
| 2014/0172275 A1 | 6/2014 | Surnilla et al. |
| 2014/0297159 A1 | 10/2014 | Surnilla et al. |
| 2014/0297162 A1 | 10/2014 | Surnilla et al. |

* cited by examiner

METHOD AND SYSTEM FOR ENGINE COLD-START CONTROL

FIELD

The present description relates generally to methods and systems for controlling a vehicle engine during an engine cold-start to improve engine roughness.

BACKGROUND/SUMMARY

Engine out cold-start emissions generated before light-off of an exhaust system catalytic converter may contribute a large percentage of the total exhaust emissions. Various approaches may be used by engine control systems to expedite the attainment of the catalyst light-off temperature. For example, various combinations of valve overlap, fuel injection, and spark retard may be used to expedite catalyst warming.

One example approach, shown by Surnilla et al. in US 20140297162, leverages a split fuel injection to improve cold-start emissions and driveability. Therein, during a cold start, fuel is provided as a split fuel injection for a number of combustion events with a portion of fuel direct injected in an intake stroke, another portion of fuel direct injected in a compression stroke, and a remaining portion of fuel port injected in an exhaust stroke. In addition, spark timing is retarded. The split injection results in a stratified combustion that enables less fuel to be used while allowing for a more stable combustion as compared to a single fuel injection.

However, the inventors herein have recognized potential issues with such systems. As one example, use of split injection for an extended time may result in engine roughness. The roughness may be exacerbated as the engine warms up due to more fuel evaporating at the warmer temperature, resulting in rich misfires. The inventors have recognized that the roughness may be due to the fuel injection timing applied on the split injection being better suited for the cold engine at the cold-start, but not well suited for a partially warm engine or for a hot engine restart. On the other hand, if the split injection is replaced with a single homogeneous (e.g., intake stroke) injection to address the engine cold-start NVH issues, engine roughness may be experienced during engine idling. As such, this can lead to a misfire diagnostic code being erroneously set, causing false warranty issues.

In one example, the issues described above may be at least partly addressed by a method for an engine, comprising: starting an engine with fuel delivered as a split injection; and adjusting a fuel injection timing based on engine temperature, the injection timing advanced as the engine temperature increases. In this way, engine cold-start roughness can be reduced.

As one example, during an engine cold-start, fuel may be delivered to a cold engine as a split compression stroke direct injection for a number of combustion events since a first combustion event of the engine cold-start. Herein, for a given combustion cycle, a portion of the total fuel amount may be direct injected into the engine during an earlier portion of a compression stroke, and a remaining portion of the total fuel amount may be direct injected during a later portion of the same compression stroke. In addition, fuel may be delivered at an (average) injection timing that is closer to compression stroke TDC. Specifically, the fuel injection timing may be based on the engine coolant temperature at the engine start, before the engine starts rotating, and before a first combustion event has occurred in the engine. Then, as the engine is cranked and the engine temperature increases, while maintaining the split compression stroke direct injection, the average injection timing may be advanced from compression stroke TDC. In addition, while injection timing is advanced, spark timing may be retarded from MBT to expedite engine heating. After the engine has been sufficiently warmed (e.g., after a number of combustion events since the start), the injection timing may be retarded and fuel may be delivered as a single intake stroke direct injection.

In this way, by using a split compression injection during an engine start along with an injection timing that is adjusted based on engine temperature, engine start roughness issues can be reduced. The technical effect of advancing an average injection timing of an engine start split injection with rising engine coolant temperature is that engine smoothness is improved during both engine cold-starts and engine hot-starts. By delaying the transition to a single fuel injection, fuel economy is improved. When the injection timing is advanced during an engine cold-start, a fueling requirement of the cold engine and cold exhaust catalyst is reduced, improving cold-start emissions. By reducing the occurrence of false misfires, false warranty issues are also improved. Overall, engine start performance (for both engine cold-starts and hot starts) is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
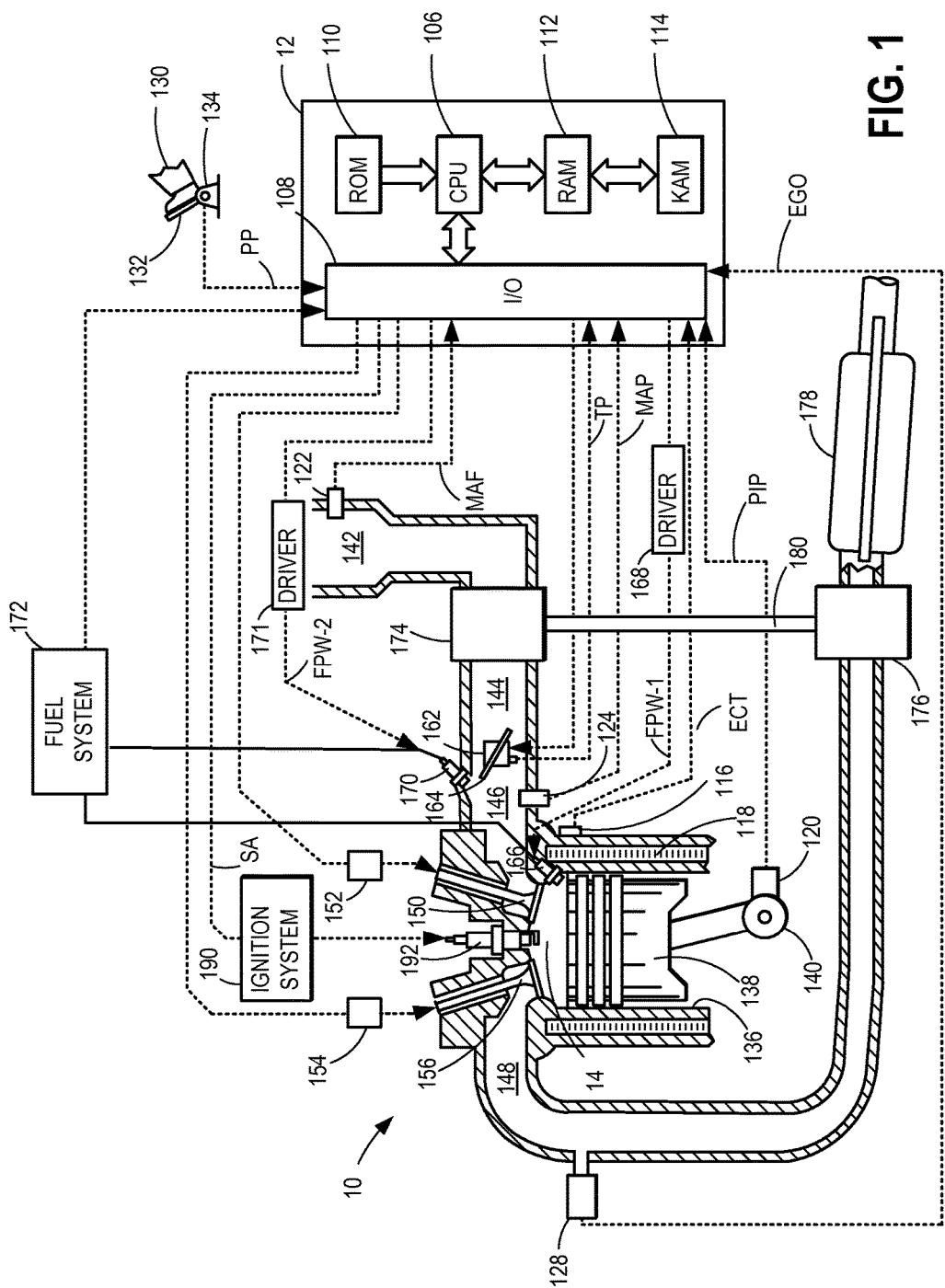
FIG. 1 shows an example combustion chamber.

The following description relates to systems and methods for adjusting a fuel injection, including an average fuel injection timing, in an internal combustion engine, such as in the engine system of FIG. 1. The fuel injection timing is adjusted during an engine start and crank based on engine coolant temperature to reduce engine start roughness. An engine controller may perform a control routine, such as the example routine of FIG. 2, to start an engine with fuel delivered as a split compression stroke direct injection, and with an average injection timing of the split fuel injections advanced as an engine coolant temperature at the engine start increases (FIG. 3). Example fuel injection profiles are shown with reference to FIGS. 4-5.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by one or both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, such as described herein below. The relative distribution of the total injected fuel among injectors 166 and 170 may be defined by a fuel injection ratio. For example, injecting a larger amount of the fuel for a combustion event via (port) injector 170 may be an example of a higher fuel injection ratio of port to direct injection, while injecting a larger amount of the fuel for a combustion event via (direct) injector 166 may be a lower fuel injection ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation.

Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke. When multiple direct injections are performed, the relative distribution of the total directed injected fuel between an intake stroke (direct) injection and a compression stroke (direct) injection may be referred to as a split injection ratio. For example, injecting a larger amount of the direct injected fuel for a combustion event during an intake stroke may be an example of a higher split injection ratio of intake stroke direct injection, while injecting a larger amount of the fuel for a combustion event during a compression stroke may be an example of a lower split injection ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

In one example, multiple compression stroke direct injections (e.g., two or more injections) may be used during an engine start (such as an engine cold-start) to improve fuel vaporization, engine startability, and cold-start emissions. As elaborated herein, when starting an engine with split fuel injection, engine roughness and false misfires may be reduced by advancing the injection timing of the split fuel injection as the engine temperature increases. By advancing split fuel injection timing during warm engine starts, and thereby injecting the fuel sooner, rich misfire events can be reduced while increasing engine start smoothness. By advancing split fuel injection timing during cold engine starts, as the engine warms up, the amount of fuel required to expedite engine warming is reduced, while also decreasing engine start roughness, and cold-start emissions.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tank in fuel system 172 may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. The controller 12 may receive input data from the various sensors of FIG. 1, process the input data, and trigger the various actuators of FIG. 1 in response to the processed input data based on instruction or code programmed therein, and stored in the memory of the controller, corresponding to one or more routines. One example routine is shown herein with reference to FIG. 2.

During standard engine operation, engine 10 is typically operated to fire each cylinder per engine cycle. Thus, for every 720 CA (e.g., two revolutions of the crankshaft), each cylinder will be fired one time. To allow for combustion in each cylinder, each intake and exhaust valve is actuated (e.g., opened) at a specified time. Further, fuel is injected to each cylinder and the spark ignition system provides a spark to each cylinder at a specified time. Accordingly, for each cylinder, the spark ignites the fuel-air mixture to initiate combustion.

Figure 2:
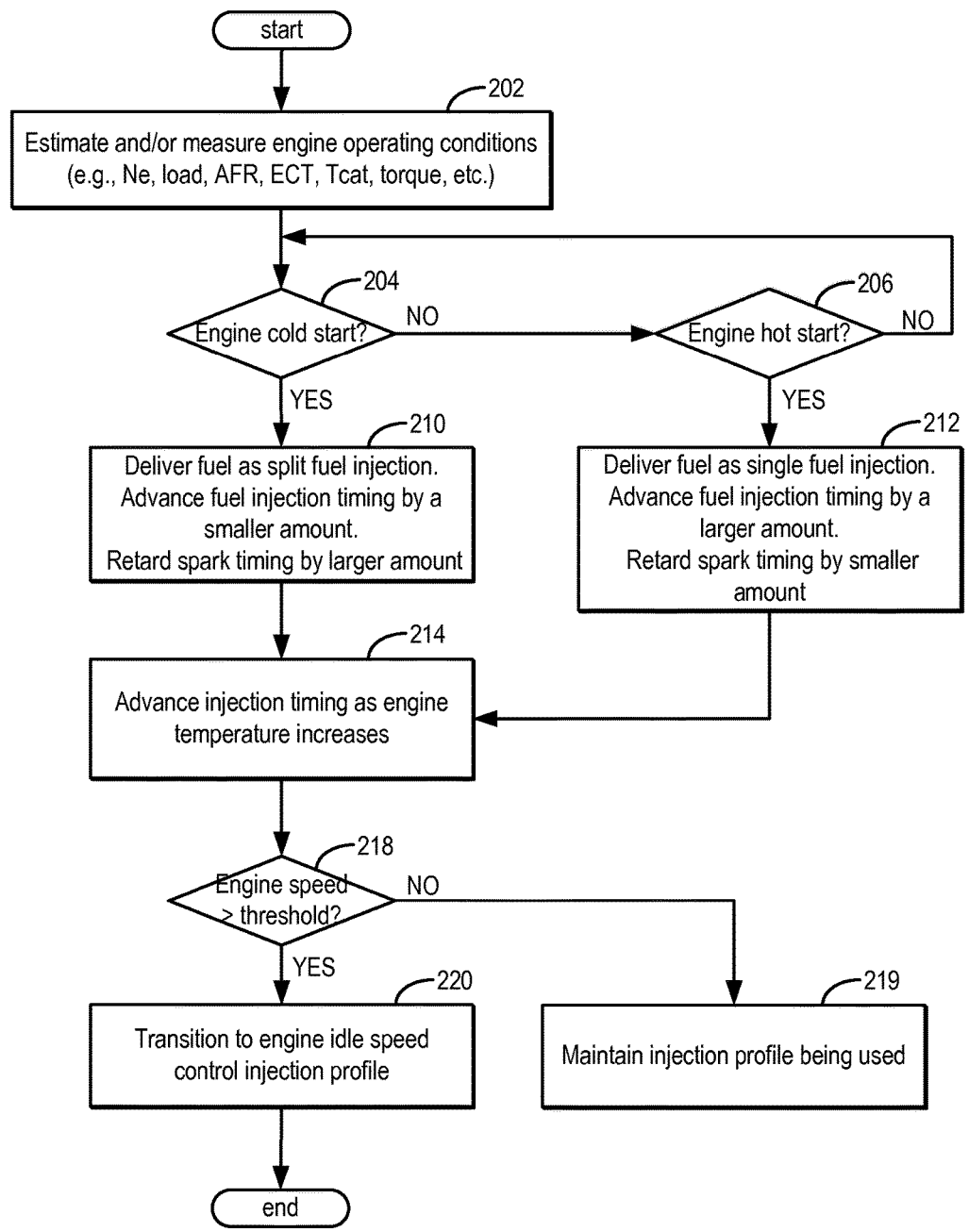
FIG. 2 shows a high level flow chart for adjusting fuel injection timing during an engine start based on engine coolant temperature to reduce engine start roughness.
Figure 3:
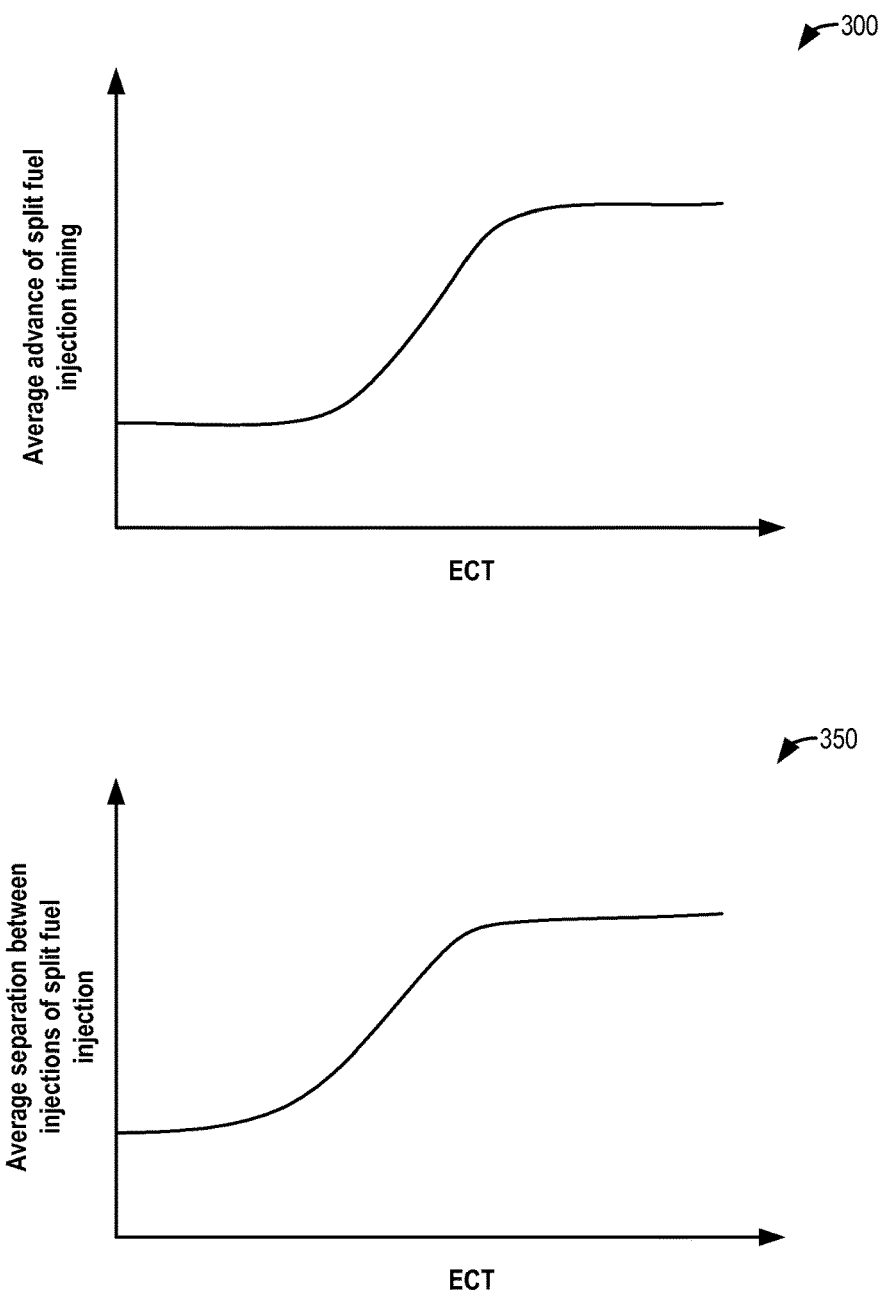
FIG. 3 shows an example relationship between a fuel injection timing advance applied during an engine start relative to engine coolant temperature, according to the present disclosure.

Now turning to FIG. 2, an example routine 200 is shown for controlling a fuel injection to an engine cylinder during an engine start based on engine temperature at the engine start to improve engine start smoothness. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, engine operating conditions may be estimated and/or measured. These may include, for example, engine speed, engine load, engine temperature (for example, as inferred from an engine coolant temperature), exhaust temperature, catalyst temperature (Tcat), desired torque, etc. Herein, the engine coolant temperature may be a temperature estimated before combustion is initiated in the engine.

At 204, it may be determined whether an engine cold-start condition is present. As such, an engine cold-start may include an initial engine start from shutdown conditions. In one example, an engine cold-start condition may be confirmed if an engine temperature is below a threshold and a catalyst temperature is below a threshold (such as below a light-off temperature). In another example, an engine cold-start condition may be confirmed if an engine start is performed after the engine has been shut down for more than a threshold duration.

In response to an engine cold-start condition being met, at 210, the routine includes operating the engine with a cold-start injection profile to expedite catalyst activation and reduce engine start roughness. The cold-start injection profile may include starting the engine with fuel delivered as a split injection. Specifically the split injection may include multiple compression stroke direct injections. For example, during a first combustion event since engine start, a first fraction of fuel may be injected earlier during a compression stroke of the combustion cycle, and a remaining second fraction of the fuel may be injected later during the compression stroke of the combustion cycle. In other words, the engine is started with fuel delivered as a split compression stroke direct injection. In another example, during the first combustion event since engine start, a first fraction of fuel may be injected during an intake stroke of the combustion cycle, and a remaining second fraction of the fuel may be injected during a compression stroke of the combustion cycle.

The split ratio of the injection, as well as the number of multiple injections of the split injection may be adjusted based on engine cold-start conditions, such as engine temperature at the time of the engine cold-start (which is a function of the ambient temperature), as well as an alcohol content of the injected fuel. In addition, the split ratio and number of injections may be further adjusted based on an exhaust catalyst temperature, and soot tendencies of the engine at the engine start. For example, as the alcohol content of the injected fuel increases, the number of compression stroke injections applied during the first combustion event may be increased. As another example, as the engine temperature, or the ambient temperature at the time of the engine cold-start decreases, the number of compression stroke injections applied during the first combustion event may be increased. In other words, a larger number of compression stroke injections may be applied during the first combustion of a colder engine cold-start (as compared to a relatively warmer engine cold-start). In one example, multiple compression stroke direct injections of an alcohol fuel may be advantageously used to heat the engine and catalyst, thereby expediting catalyst activation and improving engine and catalyst performance under engine cold-start conditions, while at the same time reducing the soot load of the direct injection.

In addition, while delivering fuel as a split injection, fuel injection timing is adjusted based on engine temperature, the injection timing advanced as the engine temperature at the engine starting increases. Herein, the engine temperature includes an engine coolant temperature estimated before the engine starts rotating, and before a first combustion event has occurred in the engine. For example, during the engine cold-start, fuel injection timing may be advanced by a smaller amount. In one example, wherein the split injection includes a first fraction of fuel direct injected earlier during a compression stroke of a combustion cycle and a second fraction of fuel direct injected later during the compression stroke of the combustion cycle, the injection timing may be an average injection timing of the first and second fractions. In one example, the injection timing is advanced from compression stroke TDC as the engine temperature increases at the engine cold-start. As an example, during the cold-start, fuel injection timing may be advanced from 16 degrees BTDC to 20 degrees BTDC.

In addition to the cold-start fuel injection profile, spark timing may be retarded. The amount of spark retard applied may be based on one or more of the alcohol content of the fuel, the exhaust catalyst temperature and the engine temperature at the engine start. For example, as the alcohol content of the fuel increases, or as the engine temperature at the cold-start increases, to supply additional heat to the exhaust catalyst, the spark timing may be retarded further from MBT. Herein, during the starting, the controller may retard spark timing from MBT while the injection timing is advanced for the first combustion event as well as a number of combustion events since the first combustion event.

The amount of spark retard applied may be further based on the fuel injection timing. For example, as the fuel injection timing is advanced further from compression stroke TDC, spark timing may be advanced for combustion stability.

If an engine cold-start condition is not confirmed, at 206, an engine hot-start (or warm start) condition may be confirmed. As such, the engine hot-start may include an engine restart wherein the engine is restarted soon after a preceding engine shut-down (when less than the threshold duration has elapsed since the preceding shutdown). In one example, an engine hot-start condition may be confirmed if an engine temperature and/or a catalyst temperature is above a threshold.

In response to an engine hot-start condition being met, at 212, the routine includes operating the engine with a warm-start injection profile to reduce engine start and idle roughness. The warm-start injection profile may include starting the engine with fuel delivered as a split injection. Specifically the split injection may include multiple compression stroke direct injections. For example, during a first combustion event since engine start, a first fraction of fuel may be injected during an intake stroke of the combustion cycle, and a remaining second fraction of the fuel may be injected during a compression stroke of the combustion cycle. In other words, the engine is started with fuel delivered as a split compression stroke direct injection. For example, during a cold-start, the split injection may be advantageously used to gain the benefits of a lean combustion. During a hot-start, due to better vaporization, the split injection may not be needed for the lean combustion.

The split ratio of the injection, as well as the number of multiple injections of the split injection may be adjusted based on engine hot-start conditions, such as engine temperature, as well as an alcohol content of the injected fuel. In addition, the split ratio and number of injections may be further adjusted based on an exhaust catalyst temperature, and soot tendencies of the engine at the engine start. For example, as the alcohol content of the injected fuel increases, the number of injections of the split injection applied during the first combustion event may be increased. As another example, as the engine temperature at the engine start increases, the number of intake stroke injections applied during the first combustion event may be increased. In one example, a combination of intake stroke and compression stroke direct injections of an alcohol fuel may be advantageously used to improving engine performance under engine hot-start conditions, while at the same time reducing the soot load of the direct injection.

In addition, while delivering fuel as a split injection, fuel injection timing is adjusted based on engine temperature, the injection timing advanced as the engine temperature at the engine starting increases. Herein, the engine temperature includes an engine coolant temperature. For example, during the engine hot-start, fuel injection timing may be advanced by a larger amount. In one example, wherein the split injection includes a first fraction of fuel direct injected earlier during an intake stroke of a combustion cycle and a second fraction of fuel direct injected during a compression stroke of the same combustion cycle, the injection timing may be an average injection timing of the first and second fractions. In one example, the injection timing is advanced from compression stroke TDC as the engine temperature increases at the engine hot-start. As an example, during the hot-start, fuel injection timing may be advanced from 16 degrees BTDC to 20 degrees BTDC.

In addition to the hot-start fuel injection profile, spark timing may be retarded. The amount of spark retard applied may be based on one or more of the alcohol content of the fuel, the exhaust catalyst temperature and the engine temperature at the engine start. For example, during the hot-start, spark timing may be retarded less from MBT. In one example, during the engine hot-start, no spark retard may be applied and spark timing may be held at MBT or advanced from MBT.

The amount of spark retard applied may be further based on the fuel injection timing. For example, as the fuel injection timing is advanced further from compression stroke TDC, spark timing may be advanced for combustion stability.

From each of 210 and 212, the method moves to 214 wherein the method includes continuing to advance the fuel injection timing for a number of combustion events since the first combustion event of the engine start. Herein, advancing the injection timing includes continually advancing the injection timing from an initial injection timing as the engine temperature increases, the initial injection timing based on engine speed and load. Thus, with each combustion event since the engine start (that is, the engine cold-start or the engine hot-start), as the engine temperature increases, while maintaining a split fuel injection, the (average) fuel injection timing (of the split fuel injections) may be advanced. The advancing further includes maintaining a duration between the split injections. For example, where the split injection includes two compression stroke fuel injection fractions, the average injection timing may be advanced while maintaining a duration between the injection of the first fraction and injection of the second fraction. After the number of combustion events since the first combustion event have elapsed, the method includes retarding the injection timing towards compression stroke TDC as engine temperature increases.

It will be appreciated that in some examples, fuel injection timing may be advanced up till a threshold amount of advance (e.g., a maximum permissible amount of advance), and thereafter, fuel injection timing may be held at the threshold amount of advance even as the engine temperature increases. As yet another example, fuel injection timing may be advanced up towards the threshold amount of advance for a defined number of combustion events since the engine start, and thereafter, fuel injection timing may be held at advanced timing, or retarded towards the initial timing as the engine temperature increases.

At 218, it may be determined if the engine speed is higher than a threshold speed. In particular, it may be determined if cranking has been completed and an engine idling speed has been attained. In an alternate example, it may be determined if a threshold number of combustion events have elapsed since the first combustion event. If yes, then at 220, after cranking has been completed, the routine includes transitioning fuel injection to a fuel injection profile that enables idle speed control. This may include, for example, transitioning to one of only port injecting fuel or only direct injecting fuel. This may alternatively include transitioning to delivering fuel as a single intake stroke (or compression stroke) injection. As an example, the transitioning includes, after cranking, transitioning fuel injection to port injecting a portion of fuel before the intake valve opens and direct injecting a remaining portion of the fuel during an intake stroke. Herein, the injection ratio of fuel direct injected to fuel port injected may vary based on fuel mass. As such, at 218, if the threshold engine speed has not been attained, or the threshold number of combustion events has not elapsed, then at 219, the fuel injection profile being used at engine start and crank may be maintained, with fuel injection timing continuing to be advanced with engine temperature.

Figure 4:
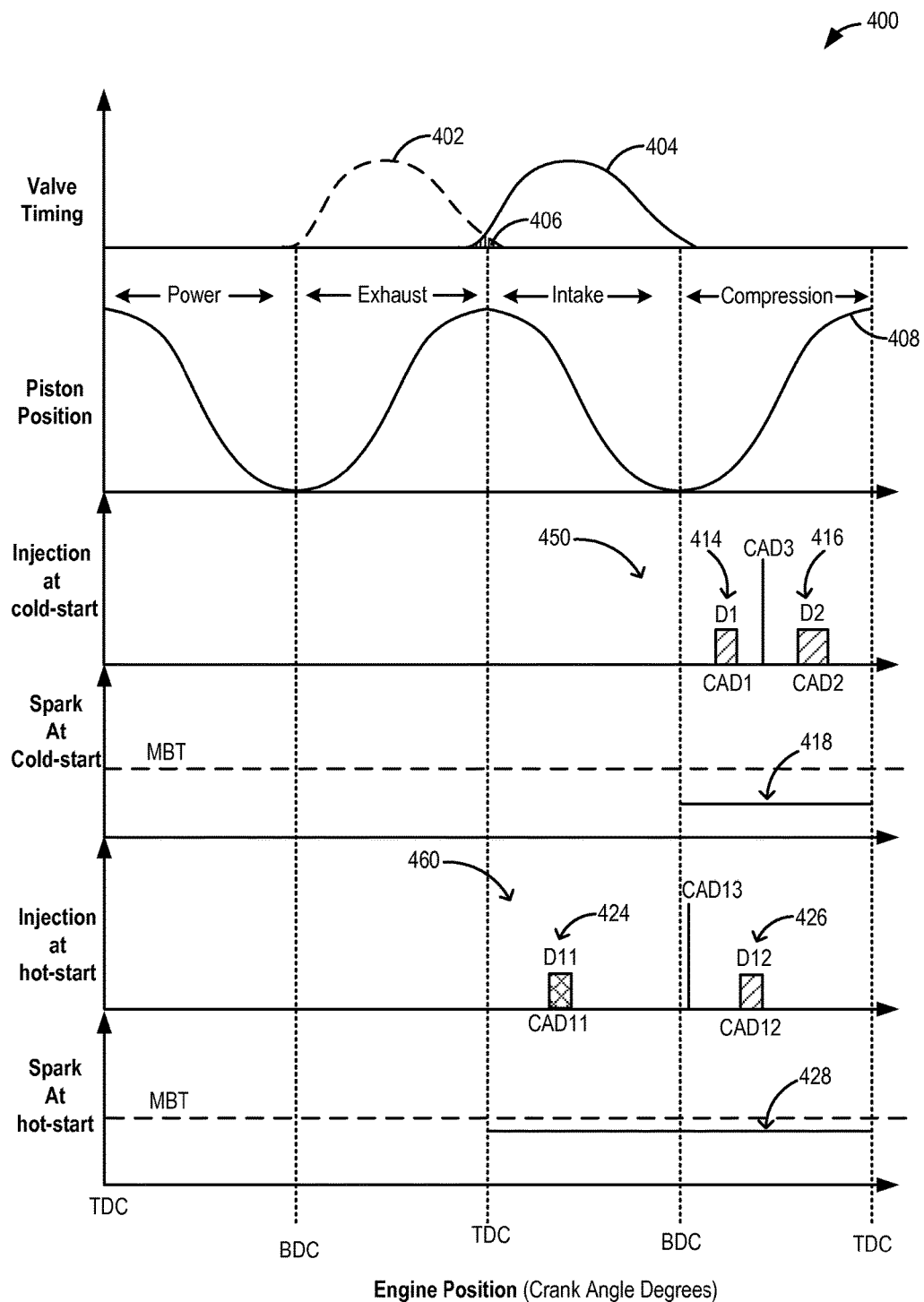
FIGS. 4-5 show example engine start fuel injection profiles including fuel injection amounts and timings, according to the present disclosure.

FIG. 3 shows a first map 300 depicting a change in average advance of split fuel injection timing with increase in engine coolant temperature (ECT). As shown, the average advance is increased at a faster rate at higher engine temperatures and at a slower rate at lower engine temperatures. FIG. 3 also shows a second map 350 depicting a change in average separation between injection of the split fuel injection with increase in engine coolant temperature (ECT). As shown, the average separation is maintained at low-mid engine temperatures, and then increased at higher engine temperatures. FIG. 4 shows a map 400 of valve timing and piston position, with respect to an engine position, for a given engine cylinder. During an engine start, while the engine is being cranked, an engine controller may be configured to adjust a fuel injection profile of fuel delivered to the cylinder. In particular, fuel may be delivered during a first combustion event of the engine start, and for a number of combustion events since the first combustion event as a split fuel injection before being transitioned to an engine idling profile with single fuel injection following engine cranking. In addition, over the number of combustion events, as the engine coolant temperature increases, the fuel injection timing (which is the average injection timing of the multiple injections of the split fuel injection) may be advanced.

Map 400 illustrates an engine position along the x-axis in crank angle degrees (CAD). Curve 408 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 408, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 402 and 404 depict valve timings for an exhaust valve (dashed curve 402) and an intake valve (solid curve 404) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 406 (or simply, positive valve overlap), represented by a hatched region at the intersection of curves 402 and 404. In one example, the positive intake to exhaust valve overlap 406 may be a default cam position of the engine present during an engine cold start.

The third plot (from the top) of map 400 depicts an example fuel injection profile 450 that may be used at an engine cold-start to reduce engine cold-start roughness. The fourth plot (from the top) of map 400 depicts an example fuel injection profile 460 that may be used at an engine hot-start to reduce engine hot-start roughness.

In the depicted example, fuel injection profile 450 used during a first combustion event of an engine cold-start includes a split compression stroke injection with a total amount of fuel delivered to the cylinder as a first, earlier compression stroke direct injection depicted at 414 (diagonally striped block), and a second, later compression stroke direct injection depicted at 416 (diagonally striped block). The first injection 414 may include a first portion of fuel (D1) that is direct injected at a first timing CAD1. Then, a remaining portion of the fuel (D2) is direct injected at CAD2 such that an average injection timing of the split fuel injection is CAD3.

In comparison, fuel injection profile 460 used during a first combustion event of an engine hot-start includes a split compression stroke injection with a total amount of fuel delivered to the cylinder as a first, intake stroke direct injection depicted at 424 (hatched striped block), and a second compression stroke direct injection depicted at 426 (diagonally striped block). The first injection 424 may include a first portion of fuel (D11) that is direct injected at a first timing CAD11. Then, a remaining portion of the fuel is direct injected (D12) at CAD12 such that an average injection timing of the split fuel injection is CAD13. As can be seen by comparing profiles 450 and 460, as the engine temperature at the engine start increases (the hot-start having a higher engine temperature than the engine cold-start), the average fuel injection timing is advanced from compression stroke TDC. The earlier injection timing reduces the likelihood of rich misfires while providing engine start smoothness.

In addition to the split injection, spark may be retarded by a larger amount during the engine cold-start (see 418) as compared to the hot-start (see 428).

Figure 5:
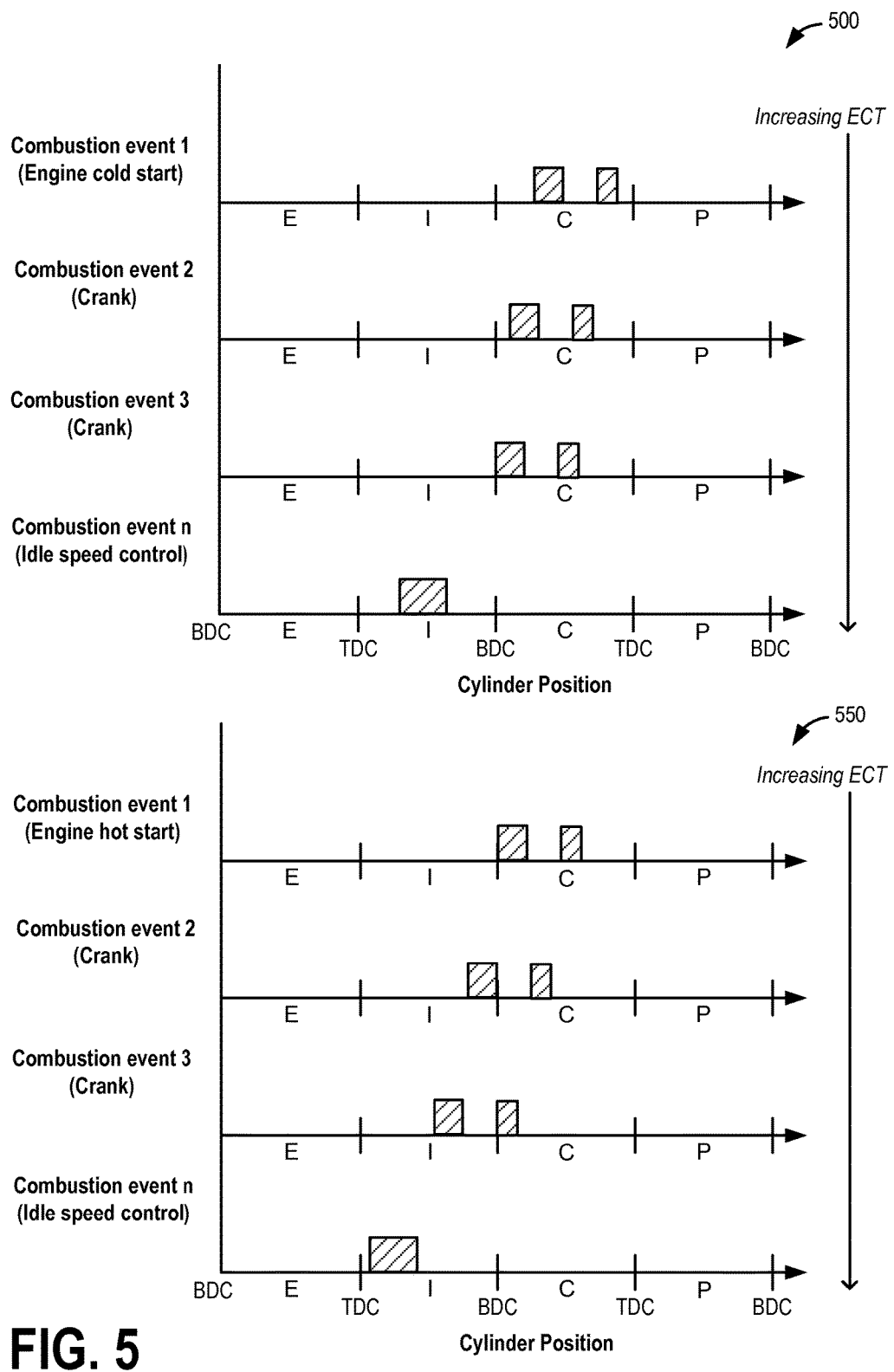

Now turning to FIG. 5, map 500 shows an example adjustment of fuel injection timing and profiles that may be used during an engine start, and subsequent cranking and engine idle control for a first engine cold-start condition (map 500) and for a second engine hot-start (map 550). As elaborated herein, for any given engine start, the injection timing may be adjusted based on engine temperature. As such, each injection profile depicts a timing of injection relative to a cylinder piston position. Based on the position of the cylinder's piston at any time in the engine cycle, fuel may be injected into the cylinder during an intake stroke (I), a compression stroke (C), a power stroke (P), or an exhaust stroke (E). The injection profile further depicts whether fuel was injected as a single injection or as split multiple injections. While not depicted, the injection profiles may further include concurrent spark timing adjustments (e.g., use of spark retard).

The first fuel injection profile 500 applied during the cold-start includes the use of a split compression stroke injection during the start and for a number of subsequent combustion events before single intake stroke injection is resumed during engine idle control. As engine coolant temperature increases, over subsequent combustion events, fuel injection timing is advanced while maintaining split fuel injection and while maintaining a duration between consecutive injections. In alternate example, the duration between the injections may be increased as the engine temperature increases.

In addition to splitting the total amount of fuel injected, the spark ignition timing may be adjusted. For example, at 500, spark timing may be −20 degrees BTDC. The second fuel injection profile 550 applied during the hot-start includes the use of a split injection with a first intake stroke injection and a second compression stroke injection during the start and for a number of subsequent combustion events before single intake stroke injection is resumed during engine idle control. As engine coolant temperature increases, over subsequent combustion events, fuel injection timing is advanced while maintaining split fuel injection and while maintaining a duration between consecutive injections. In alternate example, the duration between the injections may be decreased as the engine temperature increases.

In addition to splitting the total amount of fuel injected, the spark ignition timing may be adjusted. For example, at 550, spark timing may be +5 degrees BTDC.

In this way, a method for an engine includes, during an engine cold-start, cranking the engine with fuel delivered as a split injection at a first injection timing; and during an engine hot-start, cranking the engine with fuel delivered as a split injection at a second injection timing, the second timing advanced relative to the first timing. During the engine cold-start, fuel is delivered as a split injection at the first injection timing for a first number of combustion events, and then, as engine coolant temperature increases, fuel injection timing is advanced from the first injection timing towards the second injection timing. In comparison, during the engine hot-start, fuel is delivered as a split injection at the second injection timing for a second number of combustion events, the second number smaller than the first number, and then, as engine coolant temperature increases, fuel injection timing is retarded from the second injection timing towards the first injection timing. The split injection during the engine cold-start includes a first number of compression stroke direct injections, wherein the first injection timing is an average injection timing of the first number of compression stroke direct injections. The split injection during the engine hot-start includes a second number of compression stroke direct injections, the second number smaller than the first number, wherein the second injection timing is an average injection timing of the second number of compression stroke direct injections. The split injection during the engine cold-start includes multiple compression stroke direct injections while the split injection during the hot start includes at least a compression stroke direct injection and an intake stroke direct injection. Further, during the engine cold-start, the engine is cranked with spark timing retarded by a larger amount, while during the engine hot-start, the engine is cranked with spark timing retarded by a smaller amount.

In another example, an engine system comprises an engine including a cylinder; a direct injector for injecting fuel directly into the cylinder; a temperature sensor for estimating an engine coolant temperature; and a controller. The controller may be configured with computer-readable instructions stored on non-transitory memory for: during an engine start, for a number of combustion events since a first combustion event, operating the engine with fuel delivered as multiple compression stroke injections and with an average injection timing of the multiple compression stroke injections advanced from compression stroke TDC, an amount of injection timing advance increased as the engine coolant temperature (estimated before engine combustion starts) increases. The controller may include further instructions for: after the number of combustion events, while continuing to operate the engine with fuel delivered as multiple compression stroke injections, retarding the average injection timing of the multiple compression stroke injections towards compression stroke TDC, an amount of injection timing retard increased as the engine coolant temperature increases. The controller may include still further instructions for, during the number of combustion events, retarding spark timing from MBT, an amount of spark retard based on the injection timing advance, and after the number of combustion events, adjusting the amount of spark retard based on engine speed and load.

In this way, by adjusting a fuel injection timing of a split injection during an engine start responsive to engine coolant temperature at the engine start (and before the first combustion event in the engine), engine start and idle roughness is reduced. In particular, engine smoothness is improved for both engine cold-starts and warm starts. By transitioning from the split fuel injection to a single fuel injection at a later point in the engine drive cycle, rich misfire incidences are reduced, reducing issues associated with false warranties. In addition, the combined used of a split fuel injection and an advanced fuel injection timing enables catalyst heating to be expedited with a lower amount of fuel, improving fuel economy and cold-start exhaust emissions. By reducing engine start roughness, engine start performance (for both engine cold-starts and hot starts) is improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as eventF-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
starting the engine with fuel delivered as a split injection including a first fuel fraction direct injected earlier during a compression stroke of a combustion cycle and a second fuel fraction direct injected later during the compression stroke of the combustion cycle; and
advancing an average fuel injection timing of the split injection and increasing crank-angle-degrees separating the split injection as the engine temperature at the engine starting increases.

2. The method of claim 1, wherein advancing the average fuel injection timing includes advancing the injection timing of each of the injections of the split injection.

3. The method of claim 1, wherein the average fuel injection timing is advanced from an initial injection timing as the engine temperature increases, the initial injection timing based on engine speed and load.

4. The method of claim 1, wherein the average fuel injection timing is advanced from compression stroke TDC as the engine temperature increases.

5. The method of claim 4, further comprising maintaining the average fuel injection timing advanced for a number of combustion events since a first combustion event of the engine start.

6. The method of claim 5, further comprising, after the number of combustion events since the first combustion event, retarding the average fuel injection timing towards compression stroke TDC as engine temperature increases.

7. The method of claim 1, further comprising, during the starting, retarding spark timing from MBT while the average fuel injection timing is advanced, wherein the average fuel injection timing is an average injection timing of the first and second fuel fractions.

8. The method of claim 1, wherein the engine starting is an engine cold-start.

9. The method of claim 1, wherein the engine temperature includes an engine coolant temperature at the engine start, before a first combustion event.

10. A method for an engine, comprising:
during an engine cold-start, cranking the engine with fuel delivered as a split injection at a first average injection timing, wherein the split injection during the engine cold-start includes a first number of compression stroke direct injections; and
during an engine hot-start, cranking the engine with fuel delivered as a split injection at a second average injection timing, the second average injection timing advanced relative to the first average injection timing, wherein the split injection during the engine hot-start includes a second number of compression stroke direct injections, the second number smaller than the first number.

11. The method of claim 10, wherein during the engine cold-start, fuel is delivered as a split injection at the first average injection timing for a first number of combustion events, and then, as engine coolant temperature increases, advancing fuel injection timing from the first average injection timing towards the second average injection timing.

12. The method of claim 11, wherein during the engine hot-start, fuel is delivered as a split injection at the second average injection timing for a second number of combustion events, the second number smaller than the first number, and then, as the engine coolant temperature increases, retarding fuel injection timing from the second average injection timing towards the first average injection timing.

13. The method of claim 11, wherein the first average injection timing is an average injection timing of the first number of compression stroke direct injections, and wherein the second average injection timing is an average injection timing of the second number of compression stroke direct injections.

14. The method of claim 10, wherein the split injection during the engine cold-start includes multiple compression stroke direct injections, and wherein the split injection during the engine hot-start includes at least a compression stroke direct injection and an intake stroke direct injection.

15. The method of claim 10, further comprising, during the engine cold-start, cranking the engine with spark timing retarded by a larger amount, and during the engine hot-start, cranking the engine with spark timing retarded by a smaller amount.

16. An engine system, comprising:
an engine including a cylinder;
a direct injector for injecting fuel directly into the cylinder;
a temperature sensor for estimating an engine coolant temperature; and
a controller with computer-readable instructions stored on non-transitory memory for:
during an engine start,
for a number of combustion events since a first combustion event, operating the engine with fuel delivered as multiple compression stroke injections during each combustion event, wherein the number of multiple compression stroke injections is adjusted based on an engine temperature and an alcohol content of an injected fuel, a number of compression stroke injections is increased as the engine temperature or the alcohol content of the injected fuel increases, and with an average injection timing of the multiple compression stroke injections advanced from compression stroke TDC, an amount of injection timing advance increased as the engine coolant temperature increases, and where a duration between injections of the multiple compression stroke injections increases as the engine coolant temperature increases.

17. The system of claim 16, wherein the controller includes further instructions for, after the number of combustion events, while continuing to operate the engine with fuel delivered as multiple compression stroke injections, retarding the average injection timing of the multiple compression stroke injections towards compression stroke TDC, an amount of injection timing retard increased as the engine coolant temperature increases.

18. The system of claim 17, wherein the controller includes further instructions for, during the number of combustion events, retarding spark timing from MBT, an amount of spark retard based on the amount of injection timing advance, and after the number of combustion events, adjusting the amount of spark retard based on engine speed and load.

* * * * *